(12) United States Patent
Lundin et al.

(10) Patent No.: US 7,677,780 B2
(45) Date of Patent: Mar. 16, 2010

(54) LIGHT GUIDE ORIENTATION CONNECTOR (75) Inventors: David J. Lundin, Woodbury, MN (US); Scott D. Gullicks, Apple Valley, MN (US); Joerg R. Purfuerst, Cologne (DE); Guenter M. Zilligen, Grevenbroich (DE)

(73) Assignee: 3M Innovative Properties Company, Saint Paul, MN (US)

( * ) Notice: Subject to any disclaimer, the term of this patent is extended or adjusted under 35 U.S.C. 154(b) by 146 days.

(21) Appl. No.: 11/676,676

(22) Filed: Feb. 20, 2007

(65) Prior Publication Data

US 2008/0198624 A1    Aug. 21, 2008

(51) Int. Cl.
*F21V 17/00*    (2006.01)
*F21V 5/00*    (2006.01)

(52) U.S. Cl. .................... 362/581; 362/551; 362/555

(58) Field of Classification Search ............... 362/267, 362/391, 551, 554, 555, 556, 558, 562, 573, 362/574, 581, 583
See application file for complete search history.

(56) References Cited

U.S. PATENT DOCUMENTS

| | | | |
|---|---|---|---|
| 4,936,668 A | 6/1990 | Mori | |
| 5,029,970 A | 7/1991 | Hengst et al. | |
| 5,086,378 A * | 2/1992 | Prince | 362/103 |
| 5,432,876 A * | 7/1995 | Appeldorn et al. | 385/31 |
| 5,450,293 A * | 9/1995 | Hoffman | 362/570 |
| 5,680,496 A | 10/1997 | Burkitt, III et al. | |
| 5,845,038 A | 12/1998 | Lundin et al. | |
| 6,289,150 B1 | 9/2001 | Zarian et al. | |
| 6,302,570 B1 * | 10/2001 | Petell et al. | 362/554 |
| 6,363,428 B2 | 3/2002 | Lundin | |
| 6,379,592 B1 | 4/2002 | Lundin et al. | |
| 6,418,252 B1 | 7/2002 | Maitland | |
| 6,623,667 B2 | 9/2003 | Lundin | |
| 6,758,588 B2 * | 7/2004 | Hsu | 362/497 |
| 6,763,172 B2 | 7/2004 | Sahlin et al. | |
| 6,827,468 B2 | 12/2004 | Galli | |
| 6,883,949 B2 | 4/2005 | Goto et al. | |
| 6,910,795 B2 * | 6/2005 | Luca et al. | 362/555 |
| 6,969,348 B2 | 11/2005 | Araii | |
| 7,090,529 B1 | 8/2006 | Wang | |
| 7,121,736 B2 | 10/2006 | Ayame | |
| 7,217,023 B2 * | 5/2007 | Iwasa et al. | 362/555 |
| 2001/0036343 A1 | 11/2001 | Okochi et al. | |
| 2003/0091820 A1 | 5/2003 | Robbins | |

(Continued)

FOREIGN PATENT DOCUMENTS

EP    1 602 955    12/2005

(Continued)

*Primary Examiner*—Jacob Y Choi (57) ABSTRACT

A light guide assembly and method of forming the assembly. The light guide assembly includes an elongate light guide having an optically smooth surface for propagating light along its length and a light emitting region extending along at least a portion of the light guide length. The light emitting region has light extraction structures extending into the elongate light guide to extract or reflect light radially from the light guide. The assembly also includes a light source connector coupled to the light input end of the light guide. The light input end has primary encoding orientation geometry. The light source connector has a first end with secondary encoding orientation geometry, configured to mate with the primary encoding orientation geometry, and an opposing second end configured to accept a light source.

14 Claims, 5 Drawing Sheets

U.S. PATENT DOCUMENTS

2004/0240829 A1   12/2004   Sahlin et al.

FOREIGN PATENT DOCUMENTS

| GB | 2 054 194 | 2/1981 |
| GB | 2 225 648 | 6/1990 |
| GB | 0615854.7 | 8/2006 |
| JP | 05-303045 | 11/1993 |
| WO | WO 98/29277 | 7/1998 |
| WO | WO 00/79318 | 12/2000 |

* cited by examiner

LIGHT GUIDE ORIENTATION CONNECTOR

FIELD

The present disclosure relates to light guide orientation connectors and particularly to light guide connectors that provide illumination orientation of a connected light fiber or guide.

BACKGROUND

Optically transmissive materials, such as glass or polymers may be used as a light guide to propagate light. A light guide often includes at least one surface adapted to receive light from a light source and an optically smooth surface for reflecting light propagating through the light guide. Common examples of light guides include optical fibers traditionally used in the data communication industry and more recently light guides used for illumination purposes. For example, U.S. Pat. No. 5,432,876 discloses one such illumination device employing light guides. In this device, light may be injected into at least one end of a light guide and allowed to exit the guide at a predetermined position or positions along the length of the guide. Light extraction structures or notches are formed in the guide. The extraction structures define first and second reflecting surfaces, which reflect in a radial direction a portion of the light propagating axially through the guide. The reflected light is directed at an angle that is less than the critical angle necessary for continued propagation along the guide according to the principle of total internal reflection. As a result, the reflected light is extracted from the guide.

Because the previously mentioned light extraction structures are formed from optically smooth surfaces, they reflect light by total internal reflection rather than by diffuse reflection. As a result, light is emitted from the light guide in a pattern dictated by the configuration and arrangement of the extraction structures along the length of the guide and in a desired radial direction.

When these radial illuminating light guides are utilized in an illumination assembly, accurate orientation of the illumination light is desired.

BRIEF SUMMARY

The present disclosure relates to light guide orientation connectors and particularly to light guide connectors that provide illumination orientation of a connected light guide. These light guide illumination assemblies includes a radial illuminating light guide having encoding orientation geometry that corresponds to a light source connector orientation encoding geometry. The encoding orientation geometry provides an illumination assembly having a radial illumination from the light guide at a predetermined orientation to ensure that light is emitted in the proper radial direction from the light guide.

In a first embodiment, a light guide assembly includes an elongate light guide having a light input end including a light input end surface, a distal end and a length therebetween. The elongate light guide has an optically smooth surface for propagating light along the length and a light emitting region extending along at least a portion of the light guide length. The light emitting region has a plurality of light extraction structures extending into the elongate light guide to extract or reflect light radially from the elongate light guide. The light input end has primary encoding orientation geometry. The assembly also includes a light source connector coupled to the light input end of the elongate light guide. The light source connector has a first end with secondary encoding orientation geometry and an opposing second end configured to accept a light source. The secondary encoding orientation geometry mates with the primary encoding orientation geometry.

In another embodiment, a method of forming a light guide assembly includes providing an elongate light guide having a light input end including a light input end surface, a distal end and a light guide length therebetween. The elongate light guide has an optically smooth surface for propagating light along the guide length and a light emitting region extending along at least a portion of the guide length. The light emitting region has a plurality of light extraction structures extending into the elongate light guide to extract or reflect light radially from the elongate light guide. The method includes forming primary encoding orientation geometry on the light input end of the elongate light guide and providing a light source connector with a first end having secondary encoding orientation geometry and an opposing second end configured to accept a light source. The secondary encoding orientation geometry mates with the primary encoding geometry. Then the method includes coupling the light source connector secondary encoding orientation geometry to the elongate light guide primary encoding orientation geometry, to form an light guide assembly.

BRIEF DESCRIPTION OF THE DRAWINGS

The invention may be more completely understood in consideration of the following detailed description of various embodiments of the invention in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying drawings that form a part hereof, and in which are shown by way of illustration several specific embodiments. It is to be understood that other embodiments are contemplated and may be made without departing from the scope or spirit of the present invention. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise.

The present disclosure relates to light guide orientation connectors and particularly to light guide connectors that provide illumination orientation of a connected light guide. These light guide illumination assemblies includes a radial illuminating light guide having encoding orientation geometry that corresponds to a light source connector orientation encoding geometry. The encoding orientation geometry provides an illumination assembly having a radial illumination from the light guide at a predetermined orientation to ensure that light is emitted in the proper radial direction from the elongate light guide relative to the light guide orientation connector. While the present invention is not so limited, an appreciation of various aspects of the invention will be gained through a discussion of the examples provided below.

Light injected into an elongate light guide or light fiber propagates through the guide along an axis of propagation substantially coincident with the longitudinal axis of the elongate guide or fiber. The light propagates through the elongate guide or fiber with a maximum cone angle measured from the axis of propagation that is determined by the critical angle necessary for total internal reflection. The maximum cone angle can be derived by calculating the critical angle required for total internal reflection from Snell's law as is well known. The maximum cone angle is the complement of the critical angle. Light can be radially (along a length of the light guide) emitted from an elongate light guide by causing light to exceed the critical angle.

Figure 1:
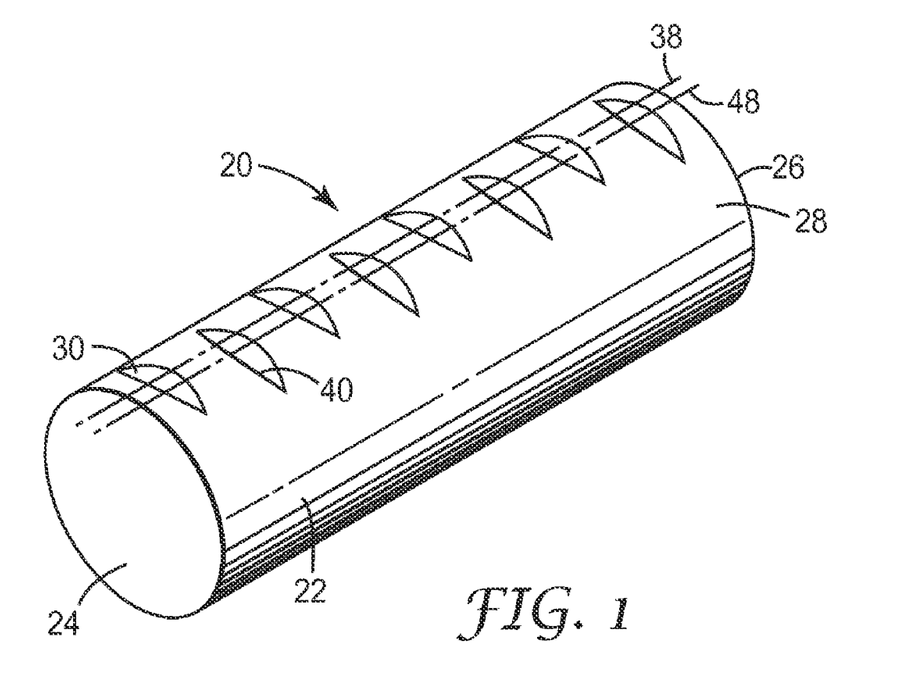
FIG. 1 is a perspective view of a segment of an elongate light guide.

FIG. 1 is a perspective view of a segment of an illustrative elongate light guide 20 for radial emission of light. The elongate light guide 20 includes an elongate body 22 having a first end or light input end 24, a second end or distal end 26, and an optically smooth surface 28 extending longitudinally along the length of the elongate light guide 20. The elongate light guide 20 can have a substantially cylindrical shape in certain embodiments. The optically smooth surface 28 propagates light along the length of the elongate light guide 20. In this embodiment, the optically smooth surface 28 corresponds to a circumferential surface of the elongate light guide 20. The optically smooth surface reflects light incident on the surface with minimal scattering or diffusion. One or more cladding layers (not shown) can be disposed about the optically smooth surface, as desired.

The elongate light guide 20 includes a plurality of light extraction structures 30, 40 extending into the elongate light guide 20. The plurality of light extraction structures 30, 40 provide a reflection or extraction surface that causes light to exceed the critical angle and extracts or reflects light radially from the elongate light guide 20. In some embodiments, a first set of light extraction structures 30 are centered about a first longitudinal axis 38 extending along the optically reflective surface 28 of the elongate light guide 20 and a second plurality of light extraction structures 40 are centered about a second longitudinal axis 48 extending along the optically reflective surface 28 of the elongate light guide 20. The first longitudinal axis 38 can be adjacent to the second longitudinal axis 48. This arrangement of light extraction structures 30, 40 can provide a controlled radial emission of light from the elongate light guide as described in U.S. Pat. No. 5,845,038, which is incorporated herein by reference. In other embodiments, the light extraction structures 30, 40 are centered about a single longitudinal axis 38, 48.

Figure 2:
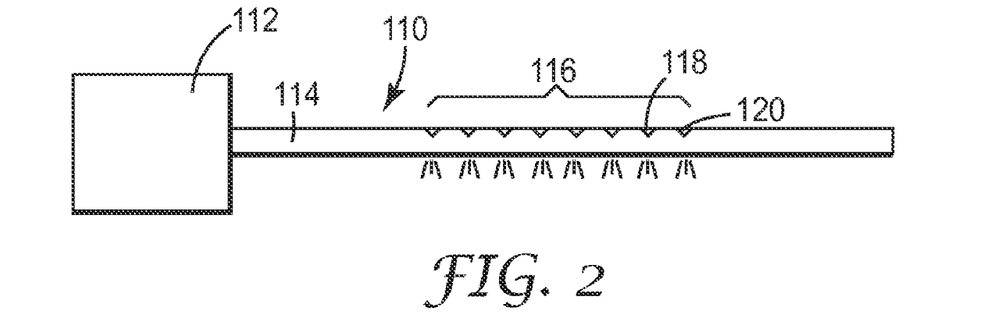
FIG. 2 is a schematic view of an elongate light guide assembly.

FIG. 2 is a schematic diagram view of an elongate light guide assembly 110 utilizing the radial light emitting elongate light guide described in FIG. 1. The light guide assembly 110 includes a light source assembly 112 coupled to an elongate light guide 114. The light source assembly 112 includes a light source (not shown) capable of directing light into the elongate light guide 114. The elongate light guide 114 includes a light emitting region 116 extending along at least a portion of the elongate light guide 114 length. The light emitting region 116 includes a plurality of light extraction structures 118, 120 extending into the elongate light guide 114, as described above. The plurality of light extraction structures 118, 120 extract or reflect light radially from the elongate light guide, as shown in FIG. 2 and described in relation to FIG. 1 above. In some embodiments, the light emitting region 116 extends along only a portion of the light guide 114 length, as shown in FIG. 2. The elongate light guides 114 described herein can be formed by any useful method such as, for example, molding or extrusion.

Elongate light guides are used for decorative and functional light purposes in various locations, some of which require the elongate light guide to emit light selectively along its length (e.g., radial emission). Elongate light guides of this type are often referred to as a linear lighting device. These linear lighting devices offer a number of advantages including, for example, the utilization of a low voltage light source such as an LED (light emitting diode) light source, and the ability to separate the light source from the illumination area.

These linear lighting devices often need to support the elongate light guide in some manner to retain the required position of the light guide and ensure that light is radially emitted in the proper direction. These linear lighting devices have a defined light emitting region and are intended to provide a directed light. Thus, installing the elongate light guide in the correct orientation is important to achieving proper directional illumination. In certain situations, installing these elongate light guides properly is difficult since the location of the light emitting region of the elongate light guide is not always clearly apparent. Providing primary encoding orientation geometry on the light input end of their elongate light guides where the primary encoding orientation geometry is properly positioned relative to the light extraction structures and mates with secondary encoding geometry on a light source connector provides a convenient assembly to ensure that the defined light emitting region of the elongate light guide directs light in the proper direction.

Figure 3:
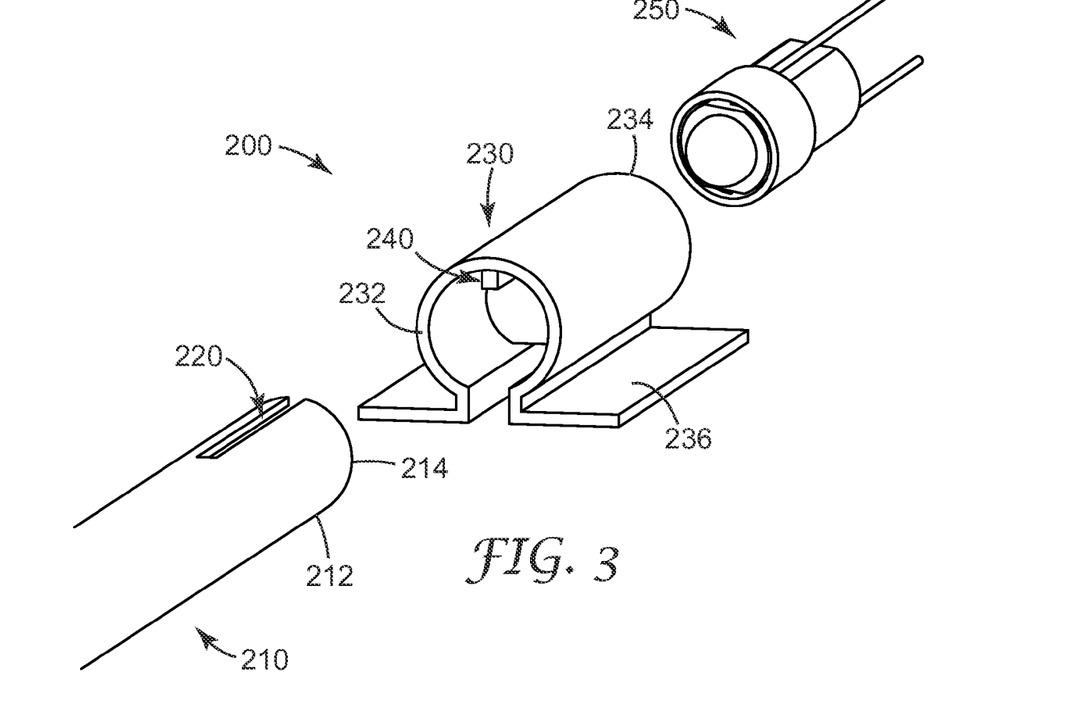
FIG. 3 is an exploded perspective view of an illustrative light guide assembly.
Figure 4:
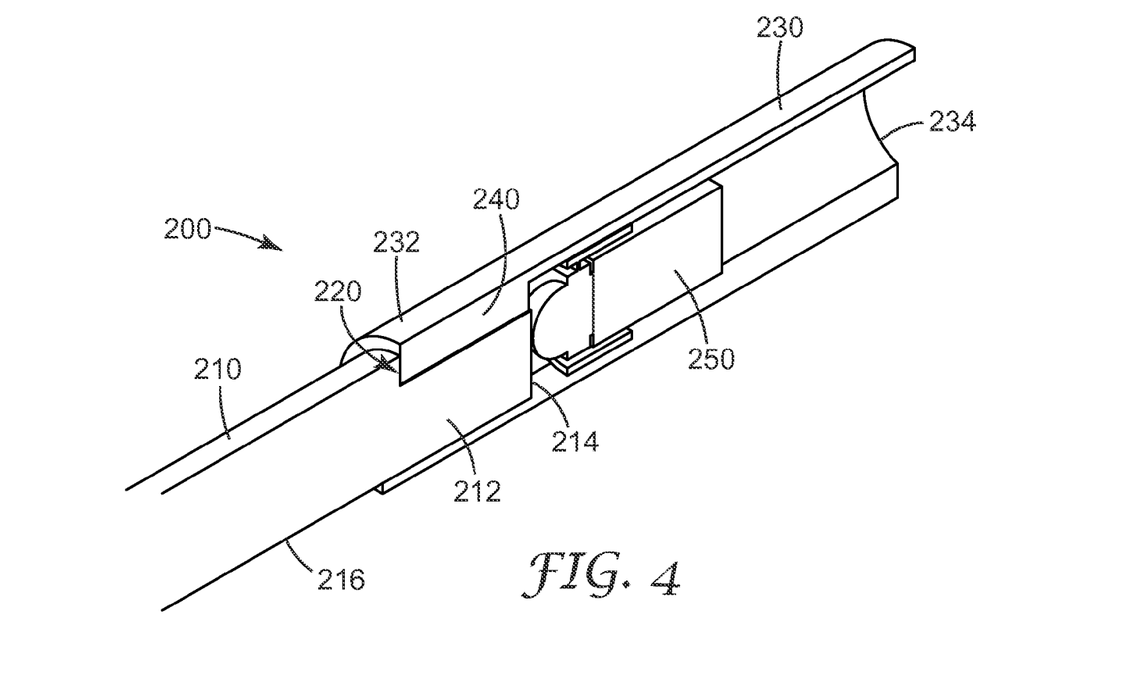
FIG. 4 is a cross-sectional view of the assembled light guide assembly shown in FIG. 3.

FIG. 3 is an exploded perspective view of an illustrative light guide assembly 200 and FIG. 4 is a cross-sectional view of the assembled light guide assembly 200 shown in FIG. 3. The light guide assembly 200 includes an elongate light guide 210 (described above) having a light input end 212 including a light input end surface 214, a distal end and a length therebetween. The elongate light guide 210 has an optically smooth surface 216 for propagating light along the length and a light emitting region (116, FIG. 2) extending along at least a portion of the light guide length. The light emitting region includes a plurality of light extraction structures (118, 120, FIG. 2) extending into the elongate light guide to extract or reflect light radially from the elongate light guide, as described above. The light input end 212 includes primary encoding orientation geometry 220.

The illustrated primary encoding orientation geometry 220 includes a notch or a recess extending into a portion of the circumference of the elongate light guide 210. The illustrated primary encoding orientation geometry 220 notch or a recess also extends into a portion of the light input end surface of the elongate light guide 210. In some embodiments, the primary encoding orientation geometry 220 includes a notch or a recess extending only into a portion of the circumference of the elongate light guide 210 (not shown). In other embodiments, the primary encoding orientation geometry 220 includes a notch or a recess extending only into a portion of the light input end surface of the elongate light guide 210 (not shown). While a single notch or recess is shown, it is understood that the primary encoding orientation geometry 220 can include two or more notches extending into a portion of the circumference of the elongate light guide 210 and/or extending into a portion of the light input end surface of the elongate light guide 210, as desired.

In some embodiments, the primary encoding geometry can include one, two or more protrusions (not shown) extending away from the circumference of the elongate light guide, in addition to, or replacing the one, two or more notch or recesses shown. In further embodiments, the primary encoding geometry can include one, two or more protrusions (not shown) extending away from the light input end surface of the elongate light guide, in addition to, or replacing the one, two or more notch or recesses shown. In many embodiments, the primary encoding orientation geometry 220 is disposed only at the light input end 212 of the elongate light guide 210. In many embodiments, the primary encoding orientation geometry 220 is separated from the plurality of light extraction structures (118, 120, FIG. 2).

A light source connector 230 is coupled to the light input end 212 of the elongate light guide 210. The light source connector 230 includes a first end 232 having secondary encoding orientation geometry 240 and an opposing second end 234 configured to accept a light source 250. The secondary encoding orientation geometry 240 mates with the primary encoding orientation geometry 220. In the illustrated embodiment, the light source connector 230 first end 232 is disposed about the circumference of the light input end 212 of the elongate light guide 210. The light source connector 230 can include a mounting flange 236 to mount the light guide assembly 200 to a mounting substrate (not shown).

The light source 250 can be any useful light source 250 for example, a solid state light source such as a light emitting diode. Light emitted by the light source 250 is coupled into the light input surface 214 of the elongate light guide 210 and propagates along the length of the elongate light guide 210 until it is radially emitted in the proper direction by the plurality of light extraction structures within the light emitting region of the elongate light guide 210, as described above. Thus, the light source connector 230 can be mounted on a substrate, the elongate light guide 210 can be coupled to the light source connector 230 via the orientation geometry 220, 240 and the orientation geometry 220, 240 ensures that the light emitting region is directed in the proper orientation since the orientation geometry 220, 240 allows for (or provides) a single angular connection between the elongate light guide 210 and the mounted light source connector 230.

Figure 5:
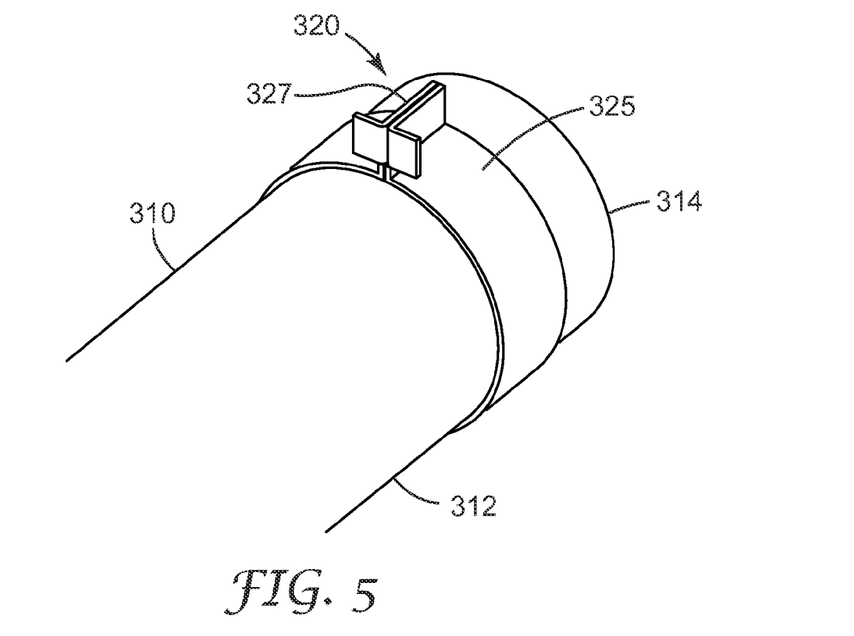
FIG. 5 is a perspective view of an illustrative primary encoding orientation geometry.
Figure 6:
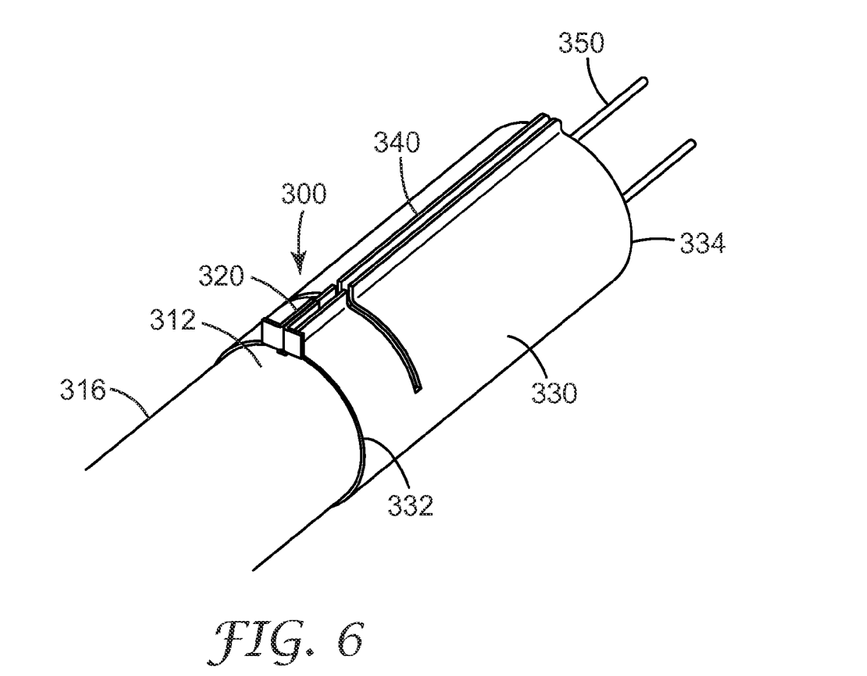
FIG. 6 is perspective view of the primary encoding orientation geometry shown in FIG. 5 coupled to an illustrative light source connector having secondary encoding orientation geometry.

FIG. 5 is a perspective view of an illustrative primary encoding orientation geometry 320 disposed on an elongate light guide 310. FIG. 6 is perspective view of the primary encoding orientation geometry 320 shown in FIG. 5 coupled to an illustrative light source connector 330 having secondary encoding orientation geometry 340.

The light guide assembly 300 includes an elongate light guide 310 (described above) having a light input end 312 including a light input end surface 314, a distal end and a length therebetween. The elongate light guide 310 has an optically smooth surface 316 for propagating light along the length and a light emitting region (116, FIG. 2) extending along at least a portion of the light guide length. The light emitting region includes a plurality of light extraction structures (118, 120, FIG. 2) extending into the elongate light guide to extract or reflect light radially from the elongate light guide, as described above. The light input end 312 includes primary encoding orientation geometry 320.

The illustrated primary encoding orientation geometry 320 is a collar 325 disposed about the circumference of the elongate light guide 310 light input end 312. The illustrated primary encoding orientation geometry 320 includes a protrusion 327 that extends away from the collar 325. The collar 325 can be formed of any useful material such as a polymer and/or a metal. In some embodiments, the collar 325 is formed of a metallic material and the elongate light guide 310 a polymeric material. The collar 325 can be crimped or otherwise fixed to the circumference of the elongate light guide 310 light input end 312 and the primary encoding orientation geometry 320 position about the circumference of the elongate light guide 310 light input end 312 is set relative to the location of the light extraction structures extending into the elongate light guide, described above. While a single protrusion 327 is shown, it is understood that the primary encoding orientation geometry 320 can include two or more protrusions extending away from the collar 325. In many embodiments, the primary encoding orientation geometry 320 is disposed only at the light input end 312 of the elongate light guide 310. In many embodiments, the primary encoding orientation geometry 320 is separated from the plurality of light extraction structures (118, 120, FIG. 2).

A light source connector 330 is coupled to the light input end 312 of the elongate light guide 310. The light source connector 330 includes a first end 332 having secondary encoding orientation geometry 340 and an opposing second end 334 configured to accept a light source 350. The secondary encoding orientation geometry 340 mates with the primary encoding orientation geometry 320. In the illustrated embodiment, the light source connector 330 first end 332 is disposed about the circumference of the light input end 312 of the elongate light guide 310 and is disposed about the collar 325. The light source connector 330 can include a mounting flange (not shown) to mount the light guide assembly 300 to a mounting substrate (not shown).

The collar 325 does not affect the cross-sectional area of the elongate light guide 310. Thus, light propagating through the elongate light guide 310 is not affected by the primary encoding orientation geometry 320. In addition, the collar 325 provides a convenient primary encoding orientation geometry 320 since the collar can be applied to an elongate light guide and then the elongate light guide can be further processed by, for example, cutting the elongate to a desired length. Then the cut elongate light guide can be assembled into the final light guide assembly.

The light source 350 can be any useful light source 350, as described above. Light emitted by the light source 350 is coupled into the light input surface 314 of the elongate light guide 310 and propagates along the length of the elongate light guide 310 until it is radially emitted in the proper direction by the plurality of light extraction structures within the light emitting region of the elongate light guide 310. Thus, the light source connector 330 can be mounted on a substrate, the elongate light guide 310 can be coupled to the light source connector 330 via the orientation geometry 320, 340 and the orientation geometry 320, 340 ensures that the light emitting region is directed in the proper orientation since the orientation geometry 320, 340 allows for a single angular connection between the elongate light guide 310 and the mounted light source connector 330.

Figure 7:
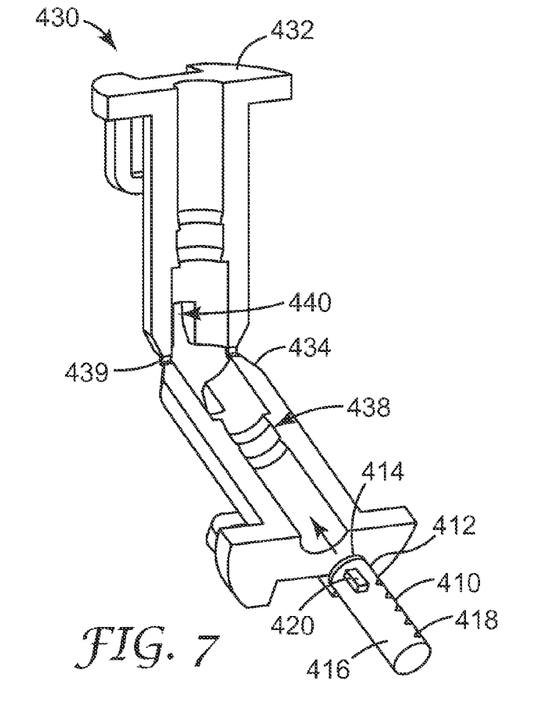
FIG. 7 is a perspective view of another illustrative light source connector having secondary encoding orientation geometry.
Figure 8:
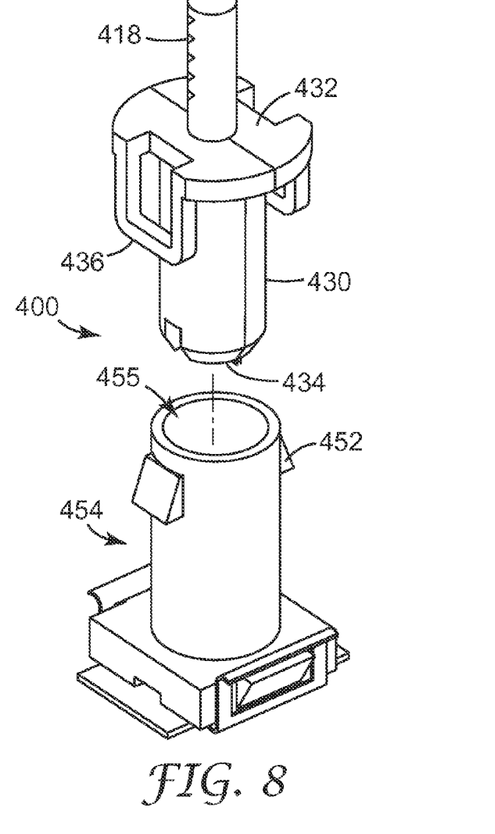
FIG. 8 and FIG. 9 are perspective views of a light guide assembly including the light source connector shown in FIG. 7.
Figure 9:
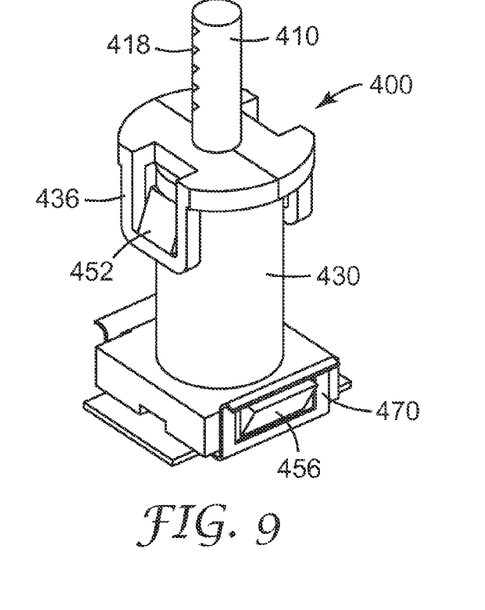

FIG. 7 is a perspective view of another illustrative light source connector 430 having secondary encoding orientation geometry 440. FIG. 8 and FIG. 9 are perspective views of a light guide assembly 400 including the light source connector 430 shown in FIG. 7.

The light guide assembly 400 includes an elongate light guide 410 (described above) having a light input end 412 including a light input end surface 414, a distal end and a length therebetween. The elongate light guide 410 has an optically smooth surface 416 for propagating light along the length and a light emitting region (116, FIG. 2) extending along at least a portion of the light guide length. The light emitting region includes a plurality of light extraction structures 418 extending into the elongate light guide to extract or reflect light radially from the elongate light guide 410, as described above. The light input end 412 includes primary encoding orientation geometry 420, as described above.

The illustrated primary encoding orientation geometry 420 includes a protrusion extending away from the circumference of the elongate light guide 410. The illustrated primary encoding orientation geometry 420 protrusion may also extend into a portion of the light input end surface 414 of the elongate light guide 410. The primary encoding orientation geometry 420 can be any of the embodiments described herein.

A hinged light source connector 430 is disposed about the circumference of the elongate light guide 410 light input end 412. The light source connector 430 includes a first end 432 having secondary encoding orientation geometry 440 and an opposing second end 434 configured to accept a light source 450. The secondary encoding orientation geometry 440 mates with the primary encoding orientation geometry 420. The light source connector 430 includes light guide holding ribs 438 to hold the elongate light guide within the light source connector 430.

The hinged light source connector 430 includes a living hinge 439 at the second end 434. The elongate light guide 410 light input end 412 is placed within the hinged light source connector 430 and the encoding orientation geometry 420, 440 is mated. Then the hinged light source connector 430 is closed about the elongate light guide 410 light input end 412 to secure the elongate light guide 410 within the hinged light source connector 430. The hinged light source connector 430 includes a mounting flange or mounting tabs 436 that mate with mounting tabs 452 on a light source housing 454. The hinged light source connector 430 is disposed within an aperture 455 formed by the light source housing 454.

A light source (not shown) is disposed within the light source housing 454 and is adjacent to the light input surface 414 of the elongate light guide 410. Base tabs 456 are disposed on the light source housing 454 and are configured to clip into retaining clips 470 of a base substrate. In many embodiments, the base substrate is a flat cable providing power to the light source disposed within the light source housing 454. The light source can be any useful light source, as described above. Light emitted by the light source is coupled into the light input surface 414 of the elongate light guide 410 and propagates along the length of the elongate light guide 410 until it is radially emitted in the proper direction by the plurality of light extraction structures 418 within the light emitting region of the elongate light guide 410. Thus, the light source connector 430 can be mounted to the light source housing 454 which is mounted to a base substrate, and the elongate light guide 410 can be coupled to the light source connector 430 via the orientation geometry 420, 440 and the orientation geometry 420, 440 ensures that the light emitting region is directed in the proper orientation since the orientation geometry 420, 440 allows for (or provides) a single angular connection between the elongate light guide 410 and the mounted light source connector 430.

Figure 10:
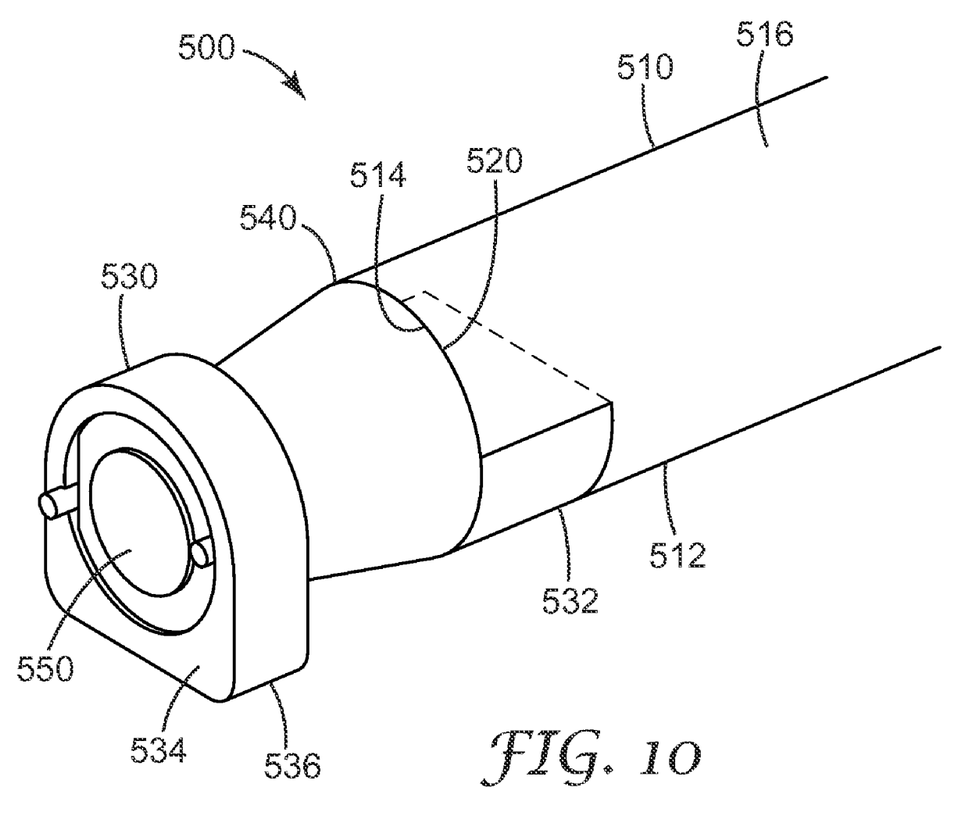
FIG. 10 is a perspective view of another illustrative light guide assembly.

FIG. 10 is a perspective view of another illustrative light guide assembly 500. The light guide assembly 500 includes an elongate light guide 510 (described above) having a light input end 512 including a light input end surface 514, a distal end and a length therebetween. The elongate light guide 510 has an optically smooth surface 516 for propagating light along the length and a light emitting region (116, FIG. 2) extending along at least a portion of the light guide length. The light emitting region includes a plurality of light extraction structures (118, 120, FIG. 2) extending into the elongate light guide to extract or reflect light radially from the elongate light guide. The light input end 512 includes primary encoding orientation geometry 520.

The illustrated primary encoding orientation geometry 520 is a recess into or a protrusion away from the light input surface 514 and forming the light input surface 514. The illustrated primary encoding orientation geometry 520 can also be described as a hemispherical notch or hemispherical step forming the light input surface 514. The primary encoding orientation geometry 520 is disposed within the circumference of the light input end 512 of the elongate light guide 510. The primary encoding orientation geometry 520 is formed of the same material that formed the elongate light guide 510. In many embodiments, the primary encoding orientation geometry 520 and the elongate light guide 510 form a unitary body. The primary encoding orientation geometry 520 and the elongate light guide 510 can be formed of a solid material such as a polymeric material, glass, and the like.

A light source connector 530 is coupled to the light input end 512 of the elongate light guide 510. The light source connector 530 includes a first end 532 having secondary encoding orientation geometry 540 and an opposing second end 534 configured to accept a light source 550. The secondary encoding orientation 540 geometry mates with the primary encoding orientation geometry 520. The illustrated secondary encoding orientation geometry 540 can be described as a hemispherical notch or hemispherical step forming a light output surface that mates with the light input surface 514.

In the illustrated embodiment, the light source connector 530 first end 532 is in contact with the light input surface 514 of the elongate light guide 510. The light source connector 530 first end 532 circumference is equal to or less than the circumference of the light input end 512 of the elongate light guide 510. In the illustrated embodiment, the secondary encoding orientation 540 geometry and the mating primary encoding orientation geometry 520 are disposed within the circumference of the light input end 512 of the elongate light guide 510. The illustrated light source connector 530 is a solid body formed of a polymeric or glass material and includes a recess configured to accept the light source 550. In many embodiments, the light source connector 530 is a solid body material and the elongate light guide 510 solid body material both have a refractive index that is substantially equal. In many embodiments, the light source connector 530 is fixed to the elongate light guide 510 with an adhesive. The light source connector 530 can include a mounting flange 536 to mount the light guide assembly 500 to a mounting substrate (not shown).

When the light source connector 530 solid body material and the elongate light guide 510 solid body material have substantially similar refractive indices and are optically coupled with an appropriate adhesive, liquid or gel, the encoding orientation geometry 520, 540 does not affect the cross-sectional area of the elongate light guide 510. Thus, light propagating through the elongate light guide 510 is not affected by the encoding orientation geometry 520, 540.

The light source 550 can be any useful light source 550, as described above. Light emitted by the light source 550 is coupled into the light input surface 514 of the elongate light guide 510 and propagates along the length of the elongate light guide 510 until it is radially emitted in the proper direction by the plurality of light extraction structures within the light emitting region of the elongate light guide 510. Thus, the light source connector 530 can be mounted on a substrate, the elongate light guide 510 can be coupled to the light source connector 530 via the orientation geometry 520, 540 and the orientation geometry 520, 540 ensures that the light emitting region is directed in the proper orientation since the orientation geometry 520, 540 allows for a single angular connection between the elongate light guide 510 and the mounted light source connector 530.

The light guide assemblies described herein can be formed by providing an elongate light guide, described above, forming primary encoding orientation geometry on the light input end of the elongate light guide, providing a light source connector having secondary encoding orientation geometry where the secondary encoding orientation geometry mates with the primary encoding geometry, and coupling the light source connector secondary encoding orientation geometry to the elongate light guide primary encoding orientation geometry, to form an light guide assembly.

Thus, embodiments of LIGHTGUIDE ORIENTATION CONNECTOR are disclosed. One skilled in the art will appreciate that embodiments other than those disclosed are envisioned. The disclosed embodiments are presented for purposes of illustration and not limitation, and the present invention should be limited only by the claims and equivalents thereof.

What is claimed is:

1. A light guide assembly comprising;
an elongate light guide having a light input end including a light input end surface, a distal end and a length therebetween, the elongate light guide having an optically smooth surface for propagating light along the length and a light emitting region extending along at least a portion of the light guide length, the light emitting region comprising a plurality of light extraction structures extending into the elongate light guide to extract or reflect light radially from the elongate light guide, the light input end comprising primary encoding orientation geometry; and
a light source connector coupled to the light input end of the elongate light guide, the light source connector comprising a first tubular end having secondary encoding orientation geometry and an opposing second tubular end configured to accept a light source, wherein the secondary encoding orientation geometry mates with the primary encoding orientation geometry;
wherein the primary encoding orientation geometry comprises a collar element disposed around an exterior circumference of the elongate light guide and fixed to the elongate light guide, and an outwardly extending protrusion extending away from the collar element, wherein the collar element slides into and mates with the elongate light guide, the protrusion mates with the secondary encoding orientation geometry, and a stopping member positions the protrusion with the secondary encoding geometry.

2. A light guide assembly comprising;
an elongate light guide having a light input end including a light input end surface, a distal end and a length therebetween, the elongate light guide having an optically smooth surface for propagating light along the length and a light emitting region extending along at least a portion of the light guide length, the light emitting region comprising a plurality of light extraction structures extending into the elongate light guide to extract or reflect light radially from the elongate light guide, the light input end comprising primary encoding orientation geometry; and
a light source connector coupled to the light input end of the elongate light guide, the light source connector comprising a first tubular end having secondary encoding orientation geometry and an opposing second tubular end configured to accept a light source, wherein the secondary encoding orientation geometry mates with the primary encoding orientation geometry;
wherein the primary encoding orientation geometry comprises a recess extending inwardly into a portion of the light input end surface of the elongate light guide and the recess extending from the light input end surface along a portion of the length of the elongate light guide, the secondary encoding orientation geometry includes a protrusion that slides into the light input end surface recess, and the recess provides guidance for sliding the protrusion into and along the portion of the light input end surface of the elongate light guide.

3. A light guide assembly according to claim 1, wherein the light guide comprises a polymeric material.

4. A light guide assembly comprising;
an elongate light guide having a light input end including a light input end surface, a distal end and a length therebetween, the elongate light guide having an optically smooth surface for propagating light along the length and a light emitting region extending along at least a portion of the light guide length, the light emitting region comprising a plurality of light extraction structures extending into the elongate light guide to extract or reflect light radially from the elongate light guide, the light input end comprising primary encoding orientation geometry; and
a light source connector coupled to the light input end of the elongate light guide, the light source connector comprising a first tubular end having secondary encoding orientation geometry and an opposing second tubular end configured to accept a light source, wherein the secondary encoding orientation geometry mates with the primary encoding orientation geometry;

wherein the primary encoding orientation geometry comprises a recess extending into a portion of the light input end surface of the elongate light guide and the recess extending from the light input end surface along a portion of the length of the elongate light guide, and the secondary encoding orientation geometry includes a protrusion that slides into the light input end surface recess.

5. A light guide assembly according to claim 4, wherein the light source connector is disposed about a circumference of the elongate light guide.

6. A light guide assembly according to claim 4, wherein the light source connector further includes a mounting flange.

7. A light guide assembly according to claim 4, wherein the light source connector and the light guide are solid bodies, and the light source connector and the light guide have a refractive index that is substantially equal.

8. A light guide assembly according to claim 4, wherein the elongate light guide is substantially cylindrical.

9. A method of forming a light guide assembly comprising;
providing an elongate light guide having a light input end including a light input end surface, a distal end and a light guide length therebetween, the elongate light guide having an optically smooth surface for propagating light along the guide length and a light emitting region extending along at least a portion of the guide length, the light emitting region comprising a plurality of light extraction structures extending into the elongate light guide to extract or reflect light radially from the elongate light guide;
forming primary encoding orientation geometry on the light input end of the elongate light guide comprising disposing a collar element around an exterior circumference of the elongate light guide and fixed to the elongate light guide, and an outwardly extending protrusion extending away from the collar element, wherein the collar element slides into and mates with the elongate light guide, the protrusion mates with the secondary encoding orientation geometry, and a stopping member positions the protrusion with the secondary encoding geometry;
providing a light source connector comprising a first tubular end having secondary encoding orientation geometry and an opposing second tubular end configured to accept a light source, wherein the secondary encoding orientation geometry mates with the primary encoding geometry;
coupling the light source connector secondary encoding orientation geometry to the elongate light guide primary encoding orientation geometry, to form a light guide assembly.

10. A method according to claim 9, further comprising disposing a solid state light source within the second end of the light source connector.

11. A method according to claim 9, further comprising cutting the elongate light guide after forming the primary encoding orientation geometry.

12. A method according to claim 9, wherein the providing an elongate light guide step further comprises forming the elongate light guide by extrusion.

13. A method according to claim 9, wherein the providing an elongate light guide step further comprises forming the elongate light guide by molding.

14. A method according to claim 9, further comprising mounting the light source connector to a mounting substrate.

* * * * *